United States Patent
Saito et al.

(10) Patent No.: US 11,477,773 B2
(45) Date of Patent: Oct. 18, 2022

(54) USER TERMINAL, BASE STATION, AND RADIO COMMUNICATION METHOD FOR MAPPING A DEMODULATION REFERENCE SIGNAL

(71) Applicant: NTT DOCOMO, INC., Tokyo (JP)

(72) Inventors: Keisuke Saito, Tokyo (JP); Yousuke Sano, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/483,365

(22) PCT Filed: Dec. 1, 2017

(86) PCT No.: PCT/JP2017/043312
§ 371 (c)(1),
(2) Date: Aug. 2, 2019

(87) PCT Pub. No.: WO2018/142746
PCT Pub. Date: Aug. 9, 2018

(65) Prior Publication Data
US 2020/0029311 A1 Jan. 23, 2020

(30) Foreign Application Priority Data
Feb. 3, 2017 (JP) .............................. JP2017-019118

(51) Int. Cl.
*H04W 72/04* (2009.01)
*H04L 27/26* (2006.01)

(52) U.S. Cl.
CPC ....... *H04W 72/042* (2013.01); *H04L 27/2613* (2013.01)

(58) Field of Classification Search
CPC .......................... H04W 72/042; H04L 27/2613
See application file for complete search history.

(56) References Cited

U.S. PATENT DOCUMENTS 10,651,996 B2 * 5/2020 Huang .................. H04L 5/0051
2012/0218952 A1 8/2012 Kwon et al.
(Continued)

FOREIGN PATENT DOCUMENTS

JP 2015-133621 A 7/2015
WO 2015/137747 A1 9/2015

OTHER PUBLICATIONS

Ericssonm "DMRS placement configurations", 3GPP TSG-RAN WG1 #86bis, Lisbon, Portugal, Oct. 10-14, 2016, R1-1609770 (Year: 2016).*

(Continued)

*Primary Examiner* — Siming Liu
(74) *Attorney, Agent, or Firm* — Osha Bergman Watanabe & Burton LLP

(57) ABSTRACT

A terminal and base station are disclosed where the terminal includes a receiver that receives a signal of a downlink shared channel and a processor that controls reception of a demodulation reference signal included in the downlink shared channel. The processor controls reception of a demodulation reference signal based on one of a first mapping method or a second mapping method. The first mapping method being a method in which the demodulation reference signal is mapped to a fixed symbol within a slot of the downlink shared channel, and the second mapping method being a method in which the demodulation reference signal is mapped to a top symbol of symbols for which the downlink shared channel is scheduled.

11 Claims, 6 Drawing Sheets

(56) References Cited

U.S. PATENT DOCUMENTS

| | | | |
|---|---|---|---|
| 2014/0064244 A1 | 3/2014 | Kishiyama et al. | |
| 2015/0230211 A1* | 8/2015 | You | H04W 72/04 |
| | | | 370/330 |
| 2015/0282124 A1 | 10/2015 | Miao et al. | |
| 2016/0006550 A1* | 1/2016 | Cheng | H04W 48/12 |
| | | | 370/254 |
| 2016/0338049 A1* | 11/2016 | Takeda | H04W 72/0446 |
| 2016/0374071 A1 | 12/2016 | Lee et al. | |
| 2017/0272141 A1* | 9/2017 | Horiuchi | H04L 5/0051 |
| 2018/0115984 A1* | 4/2018 | Sahlin | H04L 5/0048 |

OTHER PUBLICATIONS

Qualcomm Incorporated, "Discussion on DL DMRS design", 3GPP TSG-RAN WG1 NR Ad-Hoc, Jan. 16-20, 2017 Spokane, Washington, USA, R1-1700806 (Year: 2017).*

International Search Report issued in PCT/JP2017/043312 dated Feb. 13, 2018 (7 pages).

Written Opinion of the International Searching Authority issued in PCT/JP2017/043312 dated Feb. 13, 2018 (4 pages).

Qualcomm Incorporated; "Views on DL DMRS"; 3GPP TSG-RAN WG1 #86b, R1-1610152; Libson, Portugal; Oct. 10-14, 2016 (5 pages).

Ericsson; "DMRS placement configurations"; 3GPP TSG-RAN WG1 #86bis, R1-1609770; Libson, Portugal; Oct. 10-14, 2016 (6 pages).

LG Electronics; "DMRS Design Issues in NR"; 3GPP TSG RAN WG1 Meeting #86bis, R1-1609259; Libson, Portugal; Oct. 10-14, 2016 (8 pages).

3GPP TS 36.300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).

Qualcomm et al.; "Way Forward On Frame Structure"; 3GPP TSG RAN WG1 #85, R1-165575; Nanjing, China; May 23-27, 2016 (2 pages).

3GPP TSG RAN WG1 Meeting #88; R1-17xxxxx "Draft Report of 3GPP TSG RAN WG1 #AH1_NR v0.1.0 (Spokane, USA, Jan. 16-20, 2017)" MCC Support; Athens, Greece; Feb. 13-17, 2017 (105 pages).

TSG-RAN WG1 NR AdHoc; R1-1701036 "Summary of e-mail discussions on downlink control signaling" Ericsson; Spokane, WA, USA; Jan. 16-20, 2017 (18 pages).

3GPP TSG RAN WG1 NR Ad-Hoc Meeting; R1-1700368 "UL control channel design with long duration" Intel Corporation; Spokane, USA; Jan. 16-20, 2017 (5 pages).

3GPP TSG RAN WG1 NR Ad-Hoc Meeting; R1-1700460 "NR PBCH Design" LG Electronics; Spokane, USA; Jan. 16-20, 2017 (10 pages).

3GPP TSG-RAN WG1#NR; R1-1701060 "NR-PBCH Design" Nokia, Alcatel-Lucent Shanghai Bell; Spokane, U.S.A.; Jan. 16-20, 2017 (13 pages).

3GPP TSG RAN WG1 NR Ad-Hoc Meeting; R1-1701102 "On CSI-RS Design for DL Beam Management" Nokia, Alcatel-Lucent Shanghai Bell; Spokane, USA; Jan. 16-20, 2017 (15 pages).

3GPP TSG RAN WG1 NR Ad-Hoc Meeting; R1-1700505 "Design of long duration NR-PUCCH format" LG Electronics; Spokane, USA; Jan. 16-20, 2017 (6 pages).

Office Action issued in Japanese Application No. 2018-565961; dated Sep. 15, 2020 (6 pages).

Extended European Search Report issued in European Application No. 17894963.2, dated Oct. 20, 2020 (12 pages).

Office Action issued in ARIPO Patent Application No. AP/P/2019/011823, dated Jan. 12, 2021 (6 pages).

Office Action issued in Japanese Application No. 2018-565961, dated Feb. 22, 2021 (6 pages).

Office Action issued in Chinese Application No. 201780085553.3; dated Aug. 27, 2021 (30 pages).

Office Action issued in European Application No. 17894963.2; dated Jun. 30, 2021 (7 pages).

Office Action issued in ARIPO Patent Application No. AP/P/2019/011823, dated Aug. 24, 2021 (6 pages).

Office Action in counterpart Colombian Patent Application No. NC2019/0009538 dated Aug. 10, 2021 (30 pages).

Summons to attend oral proceedings in counterpart European Patent Application No. 17 894 963.2 issued on Dec. 7, 2021 (8 pages).

Office Action in counterpart Japanese Patent Application No. 2020-206697 dated Feb. 8, 2022 (6 pages).

Office Action issued in Chinese Application No. 201780085553.3; dated Mar. 2, 2022 (10 pages).

Office Action issued in Indian Application No. 201937034119; dated Mar. 16, 2022 (7 pages).

Office Action issued in the counterpart Japanese Patent Application No. 2020-206697, dated May 24, 2022 (5 pages).

3GPP TSG RAN1 NR Ad-Hoc; R1-1700589 "Workplan for Study on NR Access Technology" NTT Docomo, Inc.; Spokane, USA; Jan. 16-20, 2017 (103 pages).

Office Action issued in Korean Application No. 10-2019-724480; dated Aug. 19, 2022 (8 pages).

* cited by examiner

USER TERMINAL, BASE STATION, AND RADIO COMMUNICATION METHOD FOR MAPPING A DEMODULATION REFERENCE SIGNAL

TECHNICAL FIELD

Embodiments of the present invention relate to a user terminal and a radio communication method in a next-generation mobile communication system.

BACKGROUND

In a UMTS (Universal Mobile Telecommunications System) network, Long Term Evolution (LTE) is specified for a higher data rate, lower latency, and the like (NPL 1). For a broader bandwidth and a higher speed based on LTE, successor systems of LTE are also studied (for example, the systems are called LTE-A (LTE-Advanced), FRA (Future Radio Access), 5G (5th generation mobile communication system), 5G+(5G plus), and New-RAT (Radio Access Technology)).

Using a broadband frequency spectrum is studied for the radio communication system of the future (for example, 5G) to meet the demands, such as ultra-high speed, large capacity, and ultra-low latency. Therefore, using a frequency band (for example, 30 to 70 GHz band) higher than the frequency band used in the existing LTE system and the like are studied in the radio communication system of the future.

Mapping a demodulation reference signal (for example, DMRS (Demodulation Reference Signal), hereinafter may also be referred to as "demodulation RS") on the forward side of a subframe is studied in the radio communication system of the future to reduce the processing time required for channel estimation and signal demodulation in the subframe (NPL 2).

CITATION LIST

Non-Patent Literature

NPL 1 3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016
NPL 2 R1-165575, Qualcomm, Ericsson, Panasonic, NTT Docomo, ZTE, Convida, Nokia, ASB, Sony, Intel, "Way Forward On Frame Structure," May 2016.

SUMMARY

A reception side (radio base station or user terminal (UE: User Equipment)) that receives the demodulation RS mapped on the forward side of the subframe performs the channel estimation based on the demodulation RS and demodulates the data channel. However, there may be interference caused by the demodulation RS or a delay during demodulation of the data channel, depending on the symbol position provided with the demodulation RS.

An aspect of the present invention is to provide a user terminal and a radio communication method that can use an appropriately mapped demodulation RS to demodulate a data signal or that can appropriately map the demodulation RS to a resource.

An aspect of the present invention provides a user terminal including: a reception section that receives a downlink signal including a data signal and a demodulation reference signal mapped to a downlink resource; and a control section that controls reception of the demodulation reference signal included in the downlink signal based on one of a first mapping method and a second mapping method set to the user terminal, in which the demodulation reference signal is mapped to a fixed symbol in a subframe in the first mapping method, and the demodulation reference signal is mapped to a top symbol of symbols to which the data signal is mapped in the subframe in the second mapping method.

According the aspect of the present invention, the demodulation RS can be appropriately mapped.

DETAILED DESCRIPTION

Hereinafter, embodiments of the present invention will be described in detail with reference to the accompanying drawings.

<Mapping Method of Demodulation RS>

A control channel may be mapped to a symbol on the forward side of a subframe. A data channel may be mapped on the back side of the symbol provided with the control channel in the subframe. The number of symbols provided with the control channel may vary. In this case, the following two methods can be considered for symbol mapping (mapping method) of a demodulation RS.

FIGS. 1A to 2B illustrate symbol mapping examples of the demodulation RS. Note that each block shown in FIGS. 1A to 2B indicates, for example, 1 RE (Resource Element) that is a radio resource domain defined by 1 symbol and 1 subcarrier. In FIGS. 1A to 2B, 1 subframe is constituted by 14 symbols.

[Mapping Method 1]

In mapping method 1, the demodulation RS is mapped to a fixed symbol within the subframe.

Figure 1B:
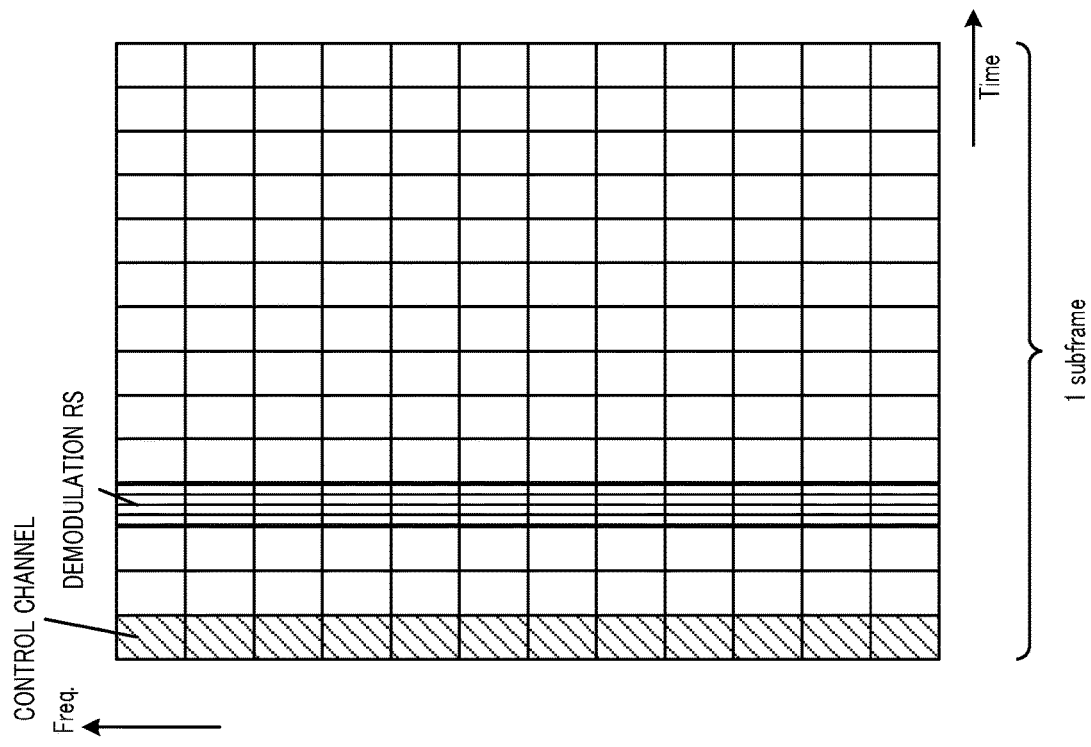
FIG. 1B illustrates a symbol mapping example (mapping method 1) of the demodulation RS according to the embodiment.
Figure 1A:
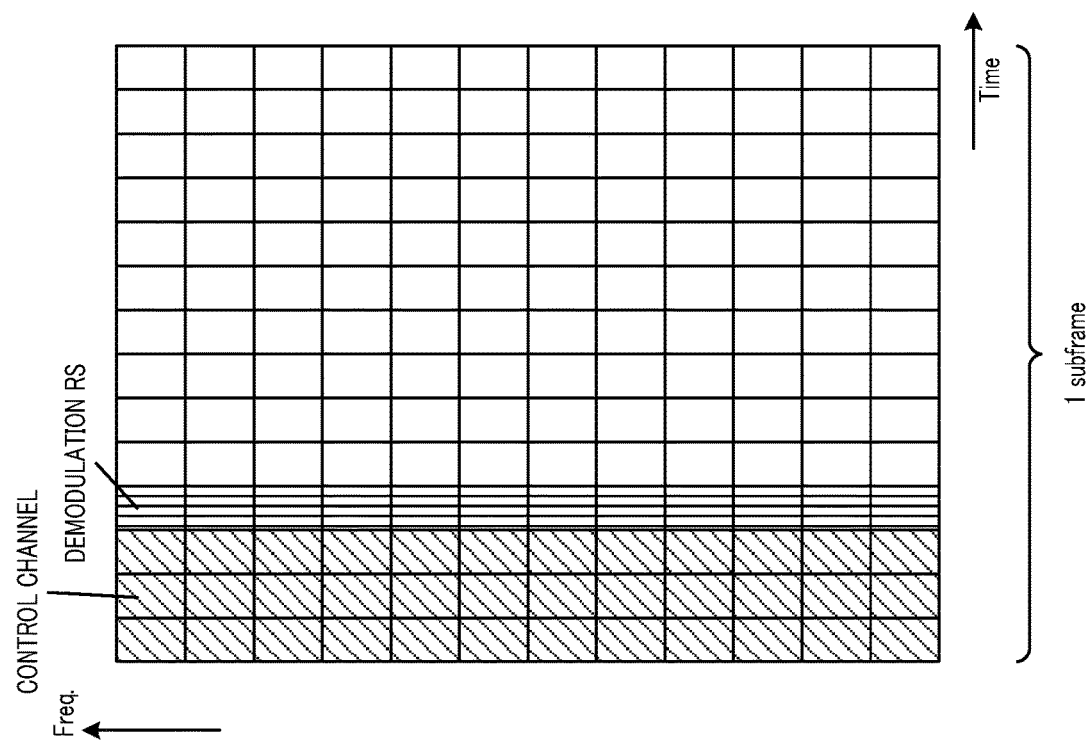
FIG. 1A illustrates a symbol mapping example (mapping method 1) of a demodulation RS according to an embodiment.

FIGS. 1A and 1B illustrate symbol mapping examples of the demodulation RS in mapping method 1.

In FIGS. 1A and 1B, the demodulation RS is mapped and fixed to a fourth symbol relative to the top of the subframe regardless of the number of symbols to which the control channel is mapped.

More specifically, the demodulation RS is mapped to the fourth symbol relative to the top of the subframe in mapping method 1 in both of a case in which the control channel is mapped to the top three symbols of the subframe as shown in FIG. 1A and a case in which the control channel is mapped to the top symbol of the subframe as shown in FIG. 1B.

According to mapping method 1, for example, the mapping of the demodulation RS can be designed in advance to prevent interference caused by the demodulation RS (for example, to prevent collision of demodulation RS) between cells or between the downlink (DL) and the uplink (UL). As a result, the interference can be easily controlled for the demodulation RS.

On the other hand, mapping method 1 may increase the delay time during the demodulation on the reception side, depending on the symbol position of the demodulation RS. For example, when the data channel is mapped to symbols (for example, second and third symbols) in front of the symbol position (fourth symbol) of the demodulation RS as shown in FIG. 1B, there is a delay on the reception side due to the waiting time for the reception of the demodulation RS during the demodulation of the data channel.

[Mapping Method 2]

In mapping method 2, the demodulation RS is mapped to a top symbol of the symbols to which the data signal (data channel) is mapped in the subframe.

Figure 2B:
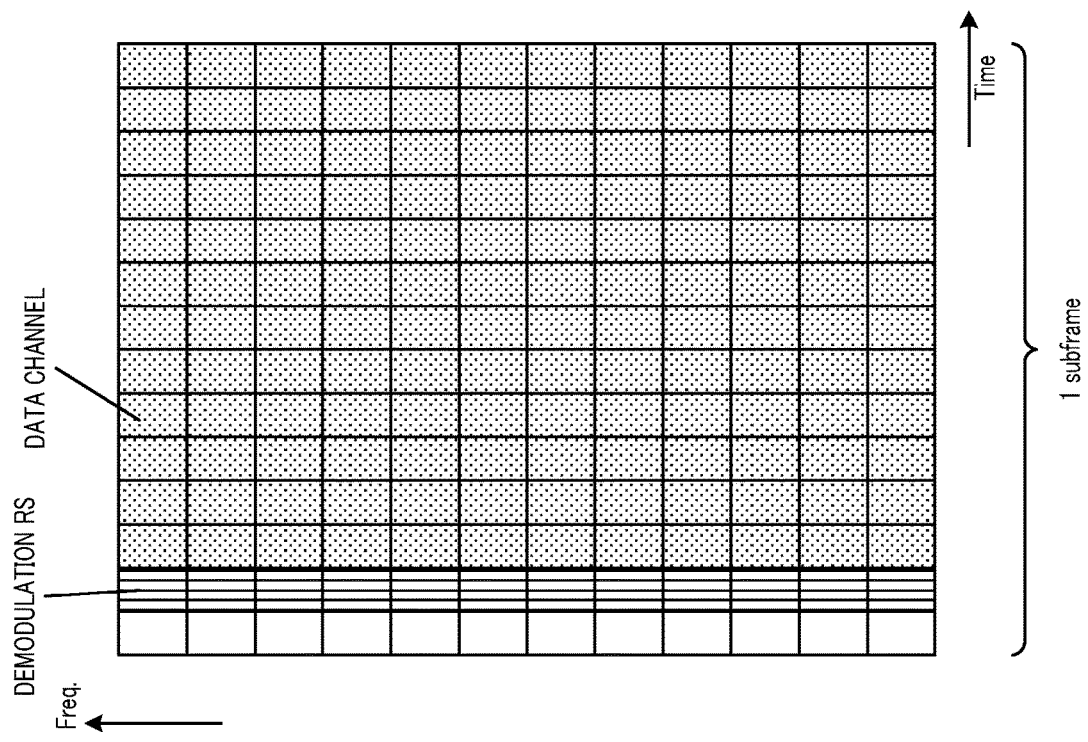
FIG. 2B illustrates a symbol mapping example (mapping method 2) of the demodulation RS according to the embodiment.
Figure 2A:
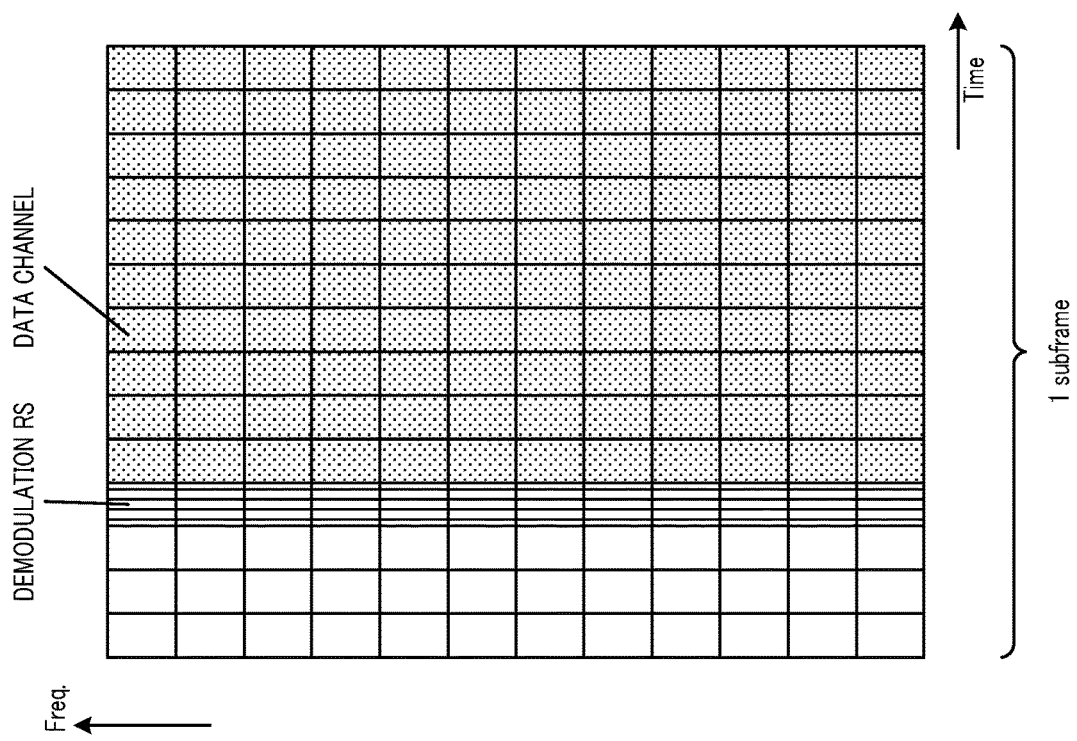
FIG. 2A illustrates a symbol mapping example (mapping method 2) of the demodulation RS according to the embodiment.

FIGS. 2A and 2B illustrate mapping examples of the demodulation RS in mapping method 2.

As shown in FIGS. 2A and 2B, the top symbol position of the data channel varies according to the number of symbols to which the control channel is mapped. Therefore, the symbol position of the demodulation RS varies according to the number of symbols provided with the data channel (or the control channel).

For example, when the data channel is mapped to the fourth symbol or a symbol after the fourth symbol relative to the top of the subframe as shown in FIG. 2A, the demodulation RS is mapped to the fourth symbol relative to the top of the subframe. When the data channel is mapped to the second symbol and/or a symbol after the second symbol relative to the top of the subframe as shown in FIG. 2B, the demodulation RS is mapped to the second symbol relative to the top of the subframe.

According to mapping method 2, the demodulation RS is mapped to the top symbol of the symbols to which the data channel is mapped, and the delay during the demodulation of the data channel can be prevented on the reception side.

On the other hand, the symbol position of the demodulation RS varies according to the allocation of the data channel (or the control channel) in mapping method 2, and the interference control becomes complicated in order to prevent interference caused by the demodulation RS between cells or between DL and UL, for example.

In this way, which one of mapping method 1 and mapping method 2 of the demodulation RS is appropriate depends on the expected communication status (scenario).

It is also desirable to support flexible mapping of the demodulation RS in consideration of expandability (forward compatibility) of the radio communication system of the future.

Therefore, a method that enables appropriate mapping of the demodulation RS will be described in the present embodiment. Specifically, a symbol for mapping the demodulation RS is decided in the present embodiment based on one of mapping method 1 (see FIGS. 1A and 1B) of mapping the demodulation RS to a fixed symbol in the subframe and mapping method 2 (see FIGS. 2A and 2B) of mapping the demodulation RS on a top symbol of the symbols provided with the data signal in the subframe.

<Radio Communication System>

Figure 3:
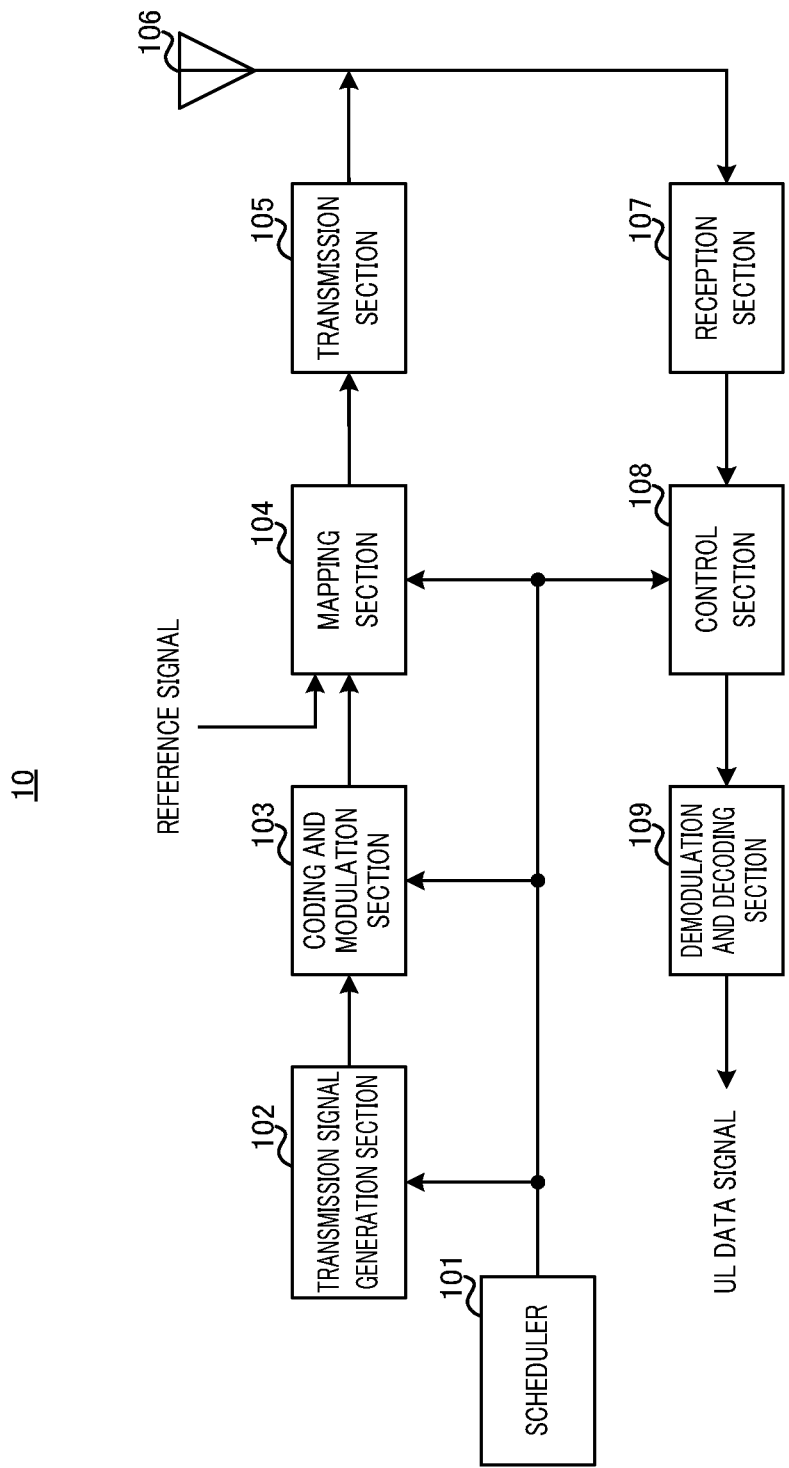
FIG. 3 is a block diagram illustrating a configuration example of a radio base station according to the embodiment.
Figure 4:
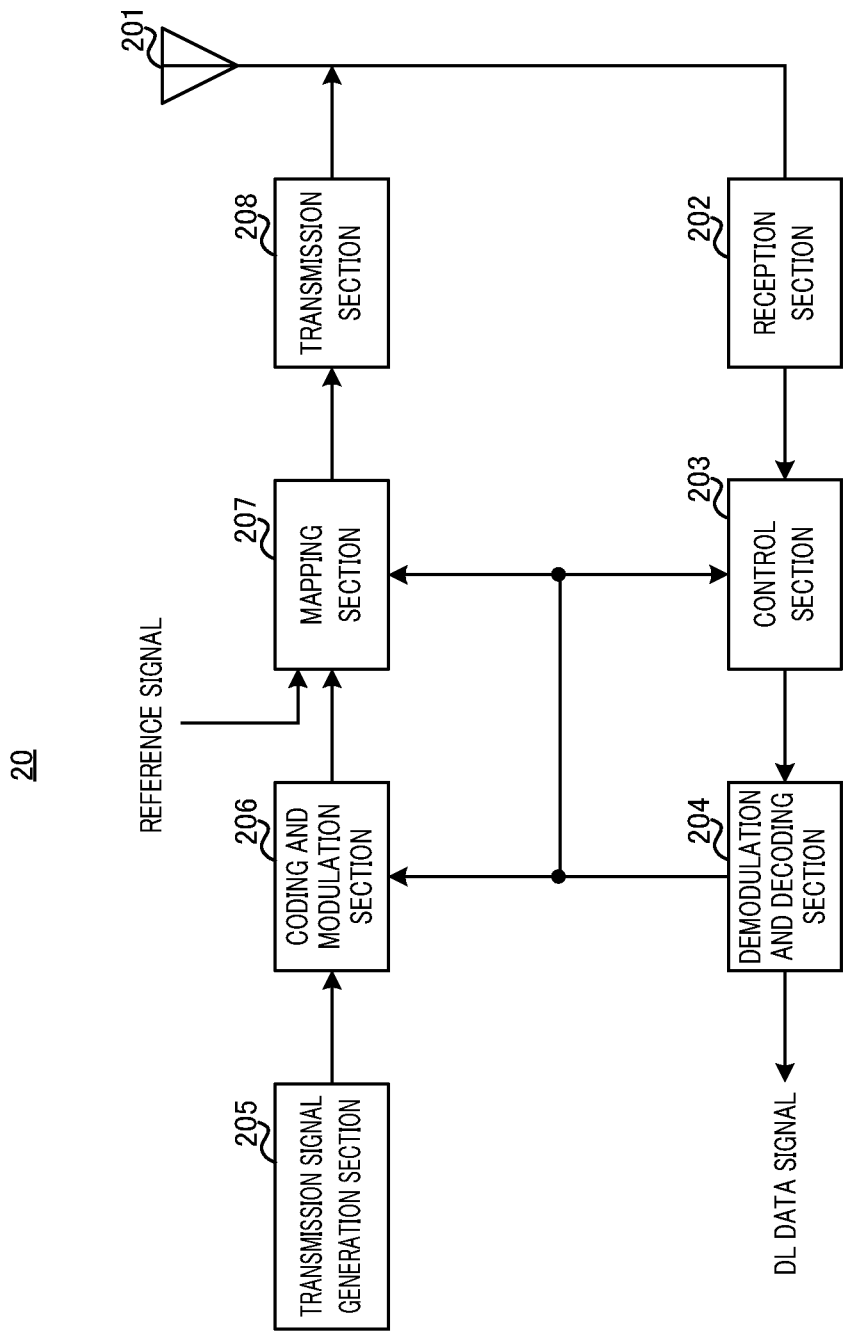
FIG. 4 is a block diagram showing a configuration example of a user terminal according to the embodiment.

A radio communication system according to the present embodiment includes at least radio base station 10 shown in FIG. 3 and user terminal 20 shown in FIG. 4. User terminal 20 is connected to (accesses) radio base station 10.

Radio base station 10 uses a downlink control channel (for example, PDCCH: Physical Downlink Control Channel) to transmit a DL control signal to user terminal 20 and uses a downlink data channel (for example, PDSCH: Physical Downlink Shared Channel) to transmit a DL data signal and a demodulation RS to user terminal 20. User terminal 20 uses an uplink control channel (for example, PUCCH: Physical Uplink Control Channel) to transmit a UL control signal to radio base station 10 and uses an uplink data channel (for example, PUSCH: Physical Uplink Shared Channel) to transmit a UL data signal and a demodulation RS to radio base station 10.

Note that the downlink channels and the uplink channels for the transmission and the reception by radio base station 10 and user terminal 20 are not limited to PDCCH, PDSCH, PUCCH, PUSCH, and/or the like, and the channels may be other channels, such as PBCH (Physical Broadcast Channel) and RACH (Random Access Channel).

In FIGS. 3 and 4, a DL/UL signal waveform generated by radio base station 10 and user terminal 20 may be a signal waveform based on OFDM (Orthogonal Frequency Division Multiplexing) modulation, may be a signal waveform based on SC-FDMA (Single Carrier-Frequency Division Multiple Access) or DFT-S-OFDM (DFT-Spread-OFDM), or may be another signal waveform. In FIGS. 3 and 4, illustration of constituent sections (for example, IFFT processing section, CP adding section, CP removing section, and FFT processing section) for generating a signal waveform are not omitted.

<Radio Base Station>

FIG. 3 illustrates an example of an overall configuration of the radio base station according to the present embodiment. Radio base station 10 shown in FIG. 1 includes scheduler 101, transmission signal generation section 102, coding and modulation section 103, mapping section 104, transmission section 105, antenna 106, reception section 107, control section 108, and demodulation and decoding section 109.

Scheduler 101 creates a schedule (for example, resource allocation) of DL signals (such as DL data signal, DL control signal, and demodulation RS). Scheduler 101 also creates a schedule (for example, resource allocation) of UL signals (such as UL data signal, UL control signal, and demodulation RS). For example, scheduler 101 performs mapping configuration of the demodulation RS for user terminal 20 based on one of mapping method 1 and mapping method 2 of the demodulation RS. Note that details of the mapping (mapping) configuration of the demodulation RS will be described later.

Scheduler 101 outputs scheduling information indicating a scheduling result to transmission signal generation section 102, mapping section 104 and control section 108.

Scheduler 101 also configures the MCS (such as code rate and modulation scheme) of the DL data signal and UL data signal based on, for example, the channel quality between radio base station 10 and terminal 20 and outputs the MCS information to transmission signal generation section 102 and coding and modulation section 103. Note that the MCS may not only be set by radio base station 10, but may also be set by user terminal 20. When user terminal 20 configures the MCS, radio base station 10 can receive the MCS information from user terminal 20 (not illustrated).

Transmission signal generation section 102 generates a transmission signal (including a DL data signal and a DL control signal). For example, the DL control signal includes the scheduling information (for example, resource allocation information of DL data signal) or downlink control information (DCI) including the MCS information output from scheduler 101. Transmission signal generation section 102 outputs the generated transmission signal to coding and modulation section 103.

Coding and modulation section 103 applies encoding processing and modulation processing to the transmission signal input from transmission signal generation section 102 based on, for example, the MCS information input from scheduler 101. Coding and modulation section 103 outputs the modulated transmission signal to mapping section 104.

Mapping section 104 maps the transmission signal input from coding and modulation section 103 to a predetermined radio resource (DL resource) based on the scheduling information (DL resource allocation and mapping configuration of the demodulation RS) input from scheduler 101. Mapping section 104 also maps the reference signal (demodulation RS) to a predetermined radio resource (DL resource) based on the scheduling information. Mapping section 104 outputs the DL signal mapped to the radio resource to transmission section 105.

Transmission section 105 applies transmission processing, such as up-conversion and amplification, to the DL signal input from mapping section 104 and transmits the radio frequency signal (DL signal) from antenna 106.

Reception section 107 applies reception processing, such as amplification and down-conversion, to the radio frequency signal (UL signal) received by antenna 106 and outputs the UL signal to control section 108.

Control section 108 separates (demaps) the UL data signal and the demodulation RS from the UL signal input from reception section 107 based on the scheduling information (resource allocation of UL or mapping configuration of demodulation RS) input from scheduler 101 and outputs the UL data signal to demodulation and decoding section 109.

Control section 108 also uses the demodulation RS to perform channel estimation and outputs a channel estimation value as an estimation result to demodulation and decoding section 109.

Demodulation and decoding section 109 applies demodulation and decoding processing to the UL data signal input from control section 108 based on the channel estimation value input from control section 108. Demodulation and decoding section 109 transfers the demodulated UL data signal to an application section (not shown). Note that the application section executes processing and the like related to a layer higher than the physical layer or the MAC layer.

<User Terminal>

FIG. 4 illustrates an example of the overall configuration of the user terminal according to the present embodiment. User terminal 20 shown in FIG. 4 includes antenna 201, reception section 202, control section 203, demodulation and decoding section 204, transmission signal generation section 205, coding and modulation section 206, mapping section 207, and transmission section 208.

Reception section 202 applies reception processing, such as amplification and down-conversion, to the radio frequency signal (DL signal) received by antenna 201 and outputs the DL signal to control section 203. The DL signal includes at least the DL data signal and the demodulation RS.

Control section 203 controls the reception of the demodulation RS and the DL data signal included in the DL signal. Specifically, control section 203 separates (demaps) the DL control signal and the demodulation RS from the DL signal input from reception section 202. In this case, control section 203 separates the demodulation RS from the DL signal based on one of mapping method 1 and mapping method 2 set to user terminal 20. Note that details of the mapping (mapping) configuration of the demodulation RS will be described later.

Control section 203 also separates (demaps) the DL data signal from the DL signal based on the scheduling information (for example, DL resource allocation information) input from demodulation and decoding section 204 and outputs the DL data signal to demodulation and decoding section 204.

Control section 203 also uses the demodulation RS to estimate the channel and outputs channel estimation values as estimation results to demodulation and decoding section 204.

Demodulation and decoding section 204 demodulates the DL control signal input from control section 203. Demodulation and decoding section 204 also applies decoding processing (for example, blind detection processing) to the demodulated DL control signal. Demodulation and decoding section 204 outputs the scheduling information (resource allocation of DL/UL or mapping configuration of demodulation RS) addressed to user terminal 20 obtained by decoding the DL control signal to control section 203 and mapping section 207 and outputs the MCS information for the UL data signal to coding and modulation section 206.

Demodulation and decoding section 204 also applies demodulation and decoding processing to the DL data signal input from control section 203 based on the channel estimation value input from control section 203 and the MCS information for the DL data signal included in the DL control signal. Demodulation and decoding section 204 also transfers the demodulated DL data signal to an application section (not illustrated). Note that the application section executes processing and the like related to a layer higher than the physical layer or the MAC layer.

Transmission signal generation section 205 generates a transmission signal (including UL data signal or UL control signal) and outputs the generated transmission signal to coding and modulation section 206.

Coding and modulation section 206 applies encoding processing and modulation processing to the transmission signal input from transmission signal generation section 205 based on, for example, the MCS information input from demodulation and decoding section 204. Coding and modulation section 206 outputs the modulated transmission signal to mapping section 207.

Mapping section 207 maps the transmission signal input from coding and modulation section 206 to a predetermined radio resource (UL resource) based on the scheduling information (resource allocation of UL) input from demodulation and decoding section 204. Mapping section 207 also maps the reference signal (demodulation RS) to predetermined radio resource (UL resource) based on the scheduling information (mapping configuration of demodulation RS). For example, mapping section 207 maps the demodulation RS to the UL resource based on one of mapping method 1 and mapping method 2 set to user terminal 20. Mapping section 207 outputs the UL signal mapped to the radio resource to transmission section 208.

Transmission section 208 applies transmission processing, such as up-conversion and amplification, to the UL signal (including at least the UL data signal and the demodulation RS) input from mapping section 207 and transmits the radio frequency signal (UL signal) from antenna 201.

<Operation of Radio Base Station 10 and User Terminal 20>

Next, operation of radio base station 10 and user terminal 20 will be described in detail.

One of mapping method 1 (see FIGS. 1A and 1B) and mapping method 2 (see FIGS. 2A and 2B) of the demodulation RS is set to user terminal 20.

For example, in a scenario in which a low latency is not requested, and a plurality of cells are present at a high density, mapping method 1 that can easily control the interference may be set to user terminal 20 at a position interfered by another cell. In a scenario in which a low latency is requested, mapping method 2 that can reduce the delay during the demodulation may be set to user terminal 20. Mapping method 2 may also be set when, for example, a signal needs to be transmitted in real time (that is, with a low latency) to user terminal 20. Therefore, an appropriate mapping method among a plurality of mapping methods of the demodulation RS can be set according to the situation (expected scenario, type of transmitted signal, and the like) of user terminal 20.

The following three mapping configuration examples 1 to 3 will be described as mapping configuration examples of the demodulation RS for user terminal 20.

[Mapping Configuration Example 1]

Figure 5A:
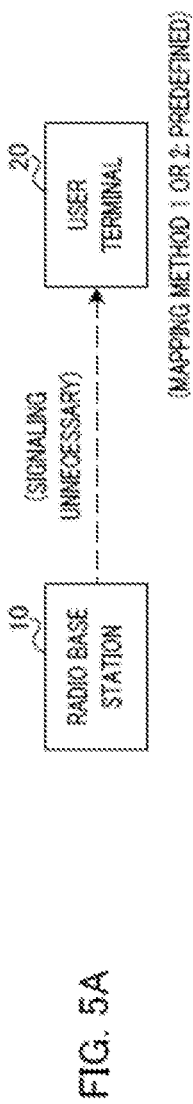
FIG. 5A illustrates an operation of mapping configuration example 1 according to the embodiment.

In mapping configuration example 1, one of mapping method 1 and mapping method 2 is predefined as a mapping method of the demodulation RS in each user terminal 20. For example, the mapping method may be predefined in each user terminal 20 according to an expected scenario as shown in FIG. 5A.

In the DL, radio base station 10 maps the demodulation RS to a symbol in the subframe based on the mapping method predefined for user terminal 20 and transmits the demodulation RS to user terminal 20. User terminal 20 receives the demodulation RS based on the mapping method predefined for user terminal 20 and demodulates the DL data signal based on the channel estimation value obtained from the demodulation RS.

In the UL, user terminal 20 maps the demodulation RS to a symbol in the subframe based on the mapping method predefined for user terminal 20 and transmits the demodulation RS to radio base station 10. Radio base station 10 receives the demodulation RS based on the mapping method predefined for user terminal 20 and demodulates the UL data signal based on the channel estimation value obtained from the demodulation RS.

In this way, according to mapping configuration example 1, user terminal 20 can apply a mapping method suitable for the communication status of user terminal 20 among a plurality of mapping methods related to a demodulation RS. In mapping configuration example 1, the mapping configuration of the demodulation RS is predefined as shown in FIG. 5A, and signaling related to the configuration of the demodulation RS is not necessary.

[Mapping Configuration Example 2]

Figure 5B:
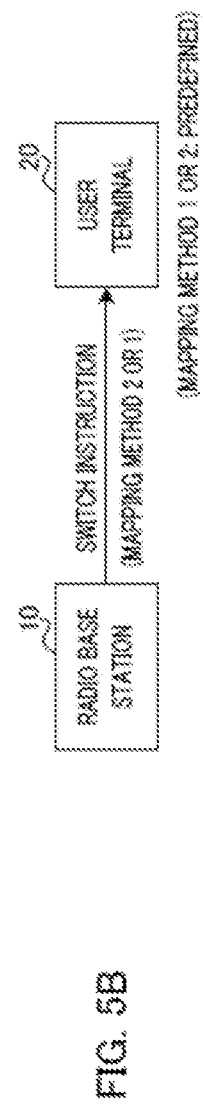
FIG. 5B illustrates an operation of mapping configuration example 2 according to the embodiment.

In mapping configuration example 2, as shown in FIG. 5B, one of mapping method 1 and mapping method 2 is predefined as a mapping method of the demodulation RS in each user terminal 20 as in mapping configuration example 1. In addition, the mapping method of the demodulation RS for user terminal 20 is changed as necessary in mapping configuration example 2. For example, a switch (switch instruction) from the mapping method predefined for user terminal 20 to another mapping method is reported to user terminal 20 as shown in FIG. 5B. Note that the mapping method of the demodulation RS may be changed semi-statically or dynamically.

For example, when a low latency is requested for user terminal 20 in which mapping method 1 is set in advance, radio base station 10 may change mapping method 1 to mapping method 2 for user terminal 20. For example, when user terminal 20 in which mapping method 2 is set in advance moves close to a cell boundary, radio base station 10 may change mapping method 2 to mapping method 1 for user terminal 20.

Therefore, in mapping configuration example 2, the mapping method of the demodulation RS can be switched when the communication environment of user terminal 20 is changed.

Note that the method of notifying the mapping configuration (switch of mapping method) of the demodulation RS from radio base station 10 to user terminal 20 will be described later.

In DL, radio base station 10 maps the demodulation RS to a symbol in the subframe based on the mapping method predefined for user terminal 20 or based on the changed mapping method and transmits the demodulation RS to user terminal 20. User terminal 20 receives the demodulation RS based on the mapping method predefined for user terminal 20 or based on the changed mapping method and demodulates the DL data signal based on the channel estimation value obtained from the demodulation RS.

In UL, user terminal 20 maps the demodulation RS to a symbol in the subframe based on the mapping method predefined for user terminal 20 or based on the changed mapping method and transmits the demodulation RS to radio base station 10. Radio base station 10 receives the demodulation RS based on the mapping method predefined for user terminal 20 or based on the changed mapping method and demodulates the UL data signal based on the channel estimation value obtained from the demodulation RS.

In this way, according to mapping configuration example 2, user terminal 20 can apply a mapping method suitable for the communication status of user terminal 20 among a plurality of mapping methods related to the demodulation RS as in mapping configuration example 1. Furthermore, according to mapping configuration example 2, the mapping method of the demodulation RS can be appropriately switched according to the change in the communication status even if the communication status of user terminal 20 is changed.

[Mapping Configuration Example 3]

Figure 5C:
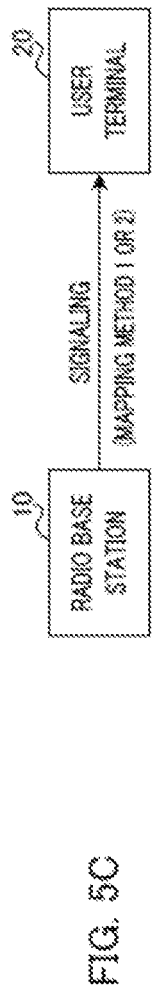
FIG. 5C illustrates an operation of mapping configuration example 3 according to the embodiment.

In mapping configuration example 3, the mapping method is not predefined as in mapping configuration examples 1 and 2, and one of mapping method 1 and mapping method 2 of the demodulation RS to be set to user terminal 20 is indicated to user terminal 20 as shown in FIG. 5C. The mapping method of the demodulation RS may be semi-statically or dynamically notified. Note that the method of notifying the mapping configuration (mapping method) of the demodulation RS will be described later.

In DL, radio base station 10 configures the mapping method of the demodulation RS for user terminal 20 and notifies user terminal 20 of the set mapping method. Radio base station 10 then maps the demodulation RS based on the mapping method set to user terminal 20 and transmits the demodulation RS to user terminal 20. User terminal 20 receives the demodulation RS based on the mapping method indicated from radio base station 10 and demodulates the DL data signal based on the channel estimation value obtained from the demodulation RS.

In UL, user terminal 20 maps the demodulation RS to a symbol in the subframe based on the mapping method indicated from radio base station 10 and transmits the demodulation RS to radio base station 10. Radio base station 10 receives the demodulation RS based on the mapping method set to user terminal 20 and demodulates the UL data signal based on the channel estimation value obtained from the demodulation RS.

In this way, according to mapping configuration example 3, user terminal 20 can appropriately switch the mapping method of the demodulation RS according to the communication status of user terminal 20.

The mapping configuration examples of the demodulation RS for user terminal 20 have been described.

Note that regarding the mapping configuration of the demodulation RS, a common mapping method may be set to user terminals 20 positioned in the same cell, or a different mapping method may be set to each user terminal 20. Furthermore, different mapping methods may be set to user terminals 20 positioned in different cells.

Next, notification methods of the mapping configuration of the demodulation RS for user terminal 20 in mapping configuration example 2 and mapping configuration example 3 will be described.

Radio base station 10 may explicitly or implicitly notify user terminal 20 of the information indicating the mapping method of the demodulation RS. For example, the switch instruction shown in FIG. 5B or the signaling shown in FIG. 5C may be information explicitly indicating the mapping method of the demodulation RS or may be information implicitly indicating the mapping method of the demodulation RS.

For example, when the mapping method of the demodulation RS is to be explicitly notified, radio base station 10 may notify user terminal 20 of the mapping method of the demodulation RS based on RRC (Radio Resource Control) signaling, MAC (Medium Access Control) signaling, PHY (physical layer) signaling, or the like. For example, radio base station 10 may use MIB (Master Information Block) transmitted by PBCH, RACH message 2 (Random Access Response: also called RAR in some cases) used in random access processing, RACH message 3, RACH message 4, SIB (System Information Block), RRC, DCI (Downlink Control Information), or the like to notify user terminal 20 of the mapping method of the demodulation RS.

When the mapping method of the demodulation RS is to be implicitly notified, radio base station 10 and user terminal 20 may, for example, associate the configuration or the like of synchronization signal (SS), PBCH, SIB, or RACH one-to-one with the mapping method (for example, mapping method 1 or 2) of the demodulation RS. For example, when a plurality of patterns are predefined for the configuration of each of SS, PBCH, SIB, and RACH, the plurality of patterns may be grouped into a group associated with mapping method 1 and a group associated with mapping method 2. In the grouping, a mapping method of the demodulation RS suitable for the communication environment in using the pattern may be associated with each pattern (for example, each pattern with a different subcarrier interval of SS).

Radio base station 10 transmits, to user terminal 20, a signal of the group associated with the mapping method of the demodulation RS set to user terminal 20. User terminal 20 then specifies, as a mapping method set to user terminal 20, the mapping method (for example, mapping method 1 or 2) of the demodulation RS associated with the group to which the signal transmitted from radio base station 10 belongs. According to the processing, the mapping configuration of the demodulation RS is implicitly notified by an existing signal, and new signaling for notifying the mapping configuration of the demodulation RS is not necessary.

In another method of implicitly notifying the mapping method of the demodulation RS, radio base station 10 may map the demodulation RS based on one of mapping methods 1 and 2 and transmit the demodulation RS to user terminal 20. User terminal 20 may execute estimation processing (blind estimation) by assuming that the demodulation RS is mapped to a symbol to which the demodulation RS can be mapped for both of mapping method 1 and mapping method 2 and specify the symbol to which the demodulation RS is mapped. According to the processing, new signaling for notifying the demodulation RS is not necessary.

Note that radio base station 10 may periodically or dynamically notify user terminal 20 of the mapping method of the demodulation RS.

Next, the mapping configuration and the notification method of the demodulation RS will be described for each type of channel provided with the demodulation RS.

[PBCH (MIB)]

In the mapping configuration of the demodulation RS for PBCH, the mapping method may be predefined and fixed as in mapping configuration example 1.

For example, it is expected that the configuration of PBCH (MIB) does not depend on the control channel and does not vary. Or it is expected that there is no high demand regarding the delay in PBCH (MIB). In this case, mapping method 1 may be set for PBCH (MIB). The processing facilitates the interference control for PBCH, and the interference can be suppressed.

Alternatively, in the mapping configuration of the demodulation RS for PBCH, mapping method 1 may be predefined, and mapping method 1 and mapping method 2 may be switchable as in mapping configuration example 2. In this case, the mapping configuration of the demodulation RS for PBCH may be implicitly notified in association with the configuration of SS transmitted at a timing earlier than PBCH. Alternatively, user terminal 20 may blindly estimate the demodulation RS in PBCH.

In any case, the method of notifying the mapping configuration of the demodulation RS when user terminal 20 receives PBCH (MIB) for the second time or later may not be limited to the methods described above. For example, instead of SS, the mapping configuration of the demodulation RS for PBCH (MIB) of the second time or later may be implicitly notified in association with the configuration of the channel (signal) transmitted at a timing earlier than PBCH of the second time or later.

In the mapping configuration of the demodulation RS for SIB, the mapping method may be predefined and fixed as in mapping configuration example 1. For example, mapping method 1 may be set for SIB as in PBCH (MIB). The processing facilitates the interference control for SIB, and the interference can be rejected.

Alternatively, in the mapping configuration of the demodulation RS for SIB, mapping method 1 may be predefined, and mapping method 1 and mapping method 2 may be switchable as in mapping configuration example 2.

Alternatively, in the mapping configuration of the demodulation RS for SIB, radio base station 10 may notify user terminal 20 of one of mapping method 1 and mapping method 2 as in mapping configuration example 3.

Note that the mapping configuration of the demodulation RS for SIB may be implicitly notified in association with the configuration of SS or PBCH transmitted at a timing earlier than SIB. Alternatively, user terminal 20 may blindly estimate the demodulation RS in SIB. Alternatively, the mapping configuration of demodulation RS for SIB may be explicitly notified by MIB that is control information transmitted at a timing earlier than SIB.

In any case, the method of notifying the mapping configuration of the demodulation RS when user terminal 20 receives SIB for the second time or later may not be limited to the methods described above. For example, instead of SS or PBCH (MIB), the mapping configuration of the demodulation RS for SIB of the second time or later may be implicitly or explicitly notified in association with the configuration of the channel (signal) transmitted at a timing earlier than SIB of the second time or later.

[RACH Message 2]

RACH message 2 is a response signal for a preamble (also called RACH or RACH message 1 in some cases) transmitted by user terminal 20 in random access processing. Therefore, RACH message 2 is a signal included in the DL channel (for example, PDSCH) transmitted from radio base station 10 to user terminal 20. The signal may be called RACH message 2 or may be called by another name such as RACH response.

In the mapping configuration of the demodulation RS for RACH message 2, the mapping method may be predefined and fixed as in mapping configuration example 1. For example, one of mapping method 1 and mapping method 2 may be set in the mapping configuration of the demodulation RS for RACH message 2.

Alternatively, in the mapping configuration of the demodulation RS for RACH message 2, one of mapping method 1 and mapping method 2 may be predefined, and mapping method 1 and mapping method 2 may be switchable as in mapping configuration example 2.

Alternatively, in the mapping configuration of the demodulation RS for RACH message 2, radio base station 10 may notify user terminal 20 of one of mapping method 1 and mapping method 2 as in mapping configuration example 3.

Note that the mapping configuration of the demodulation RS for RACH message 2 may be implicitly notified in association with the configuration of SS, PBCH, or SIB transmitted at a timing earlier than RACH message 2. Alternatively, user terminal 20 may blindly estimate the demodulation RS in RACH message 2. Alternatively, the mapping configuration of the demodulation RS for RACH message 2 may be explicitly notified by MIB or SIB that is control information transmitted at a timing earlier than RACH message 2.

In any case, the method of notifying the mapping configuration of the demodulation RS when user terminal 20 receives RACH message 2 for the second time or later may not be limited to the methods described above. For example, instead of SS, PBCH (MIB), or SIB, the mapping configuration of the demodulation RS for RACH message 2 of the second time or later may be implicitly or explicitly notified in association with the configuration of the channel (signal) transmitted at a timing earlier than RACH message 2 of the second time or later.

[RACH Message 3]

RACH message 3 is a signal for requesting connection of RRC after reception of RACH message 2 by user terminal 20 in random access processing. Therefore, RACH message 3 is a signal included in the UL channel (for example, PUSCH) transmitted from user terminal 20 to radio base station 10. The signal may be called RACH message 3 or may be called by another name such as Control Message.

In the mapping configuration of the demodulation RS for RACH message 3, the mapping method may be predefined and fixed as in mapping configuration example 1. For example, one of mapping method 1 and mapping method 2 is set in the mapping configuration of the demodulation RS for RACH message 3.

Alternatively, in the mapping configuration of the demodulation RS for RACH message 3, one of mapping method 1 and mapping method 2 may be predefined, and mapping method 1 and mapping method 2 may be switchable as in mapping configuration example 2.

Alternatively, in the mapping configuration of the demodulation RS for RACH message 3, radio base station 10 may notify user terminal 20 of one of mapping method 1 and mapping method 2 as in mapping configuration example 3.

Note that the mapping configuration of the demodulation RS for RACH message 3 may be implicitly notified in association with the configuration of SS, PBCH, SIB, or RACH transmitted at a timing earlier than RACH message 3. Alternatively, user terminal 20 may blindly estimate the demodulation RS in RACH message 3. Alternatively, the mapping configuration of the demodulation RS for RACH message 3 may be explicitly notified by MIB, SIB, or RACH message 2 that is control information transmitted at a timing earlier than RACH message 3.

In any case, the method of notifying the mapping configuration of the demodulation RS when user terminal 20 receives RACH message 3 for the second time or later may not be limited to the methods described above. For example, instead of SS, PBCH (MIB), SIB, or RACH message 2, the mapping configuration of the demodulation RS for RACH message 3 of the second time or later may be implicitly or explicitly notified in association with the configuration of the channel (signal) transmitted at a timing earlier than RACH message 3 of the second time or later.

[RACH Message 4]

RACH message 4 is a signal including control information for RRC connection after reception of RACH message 3 in random access processing. Therefore, RACH message 4 is a signal included in the DL channel (for example, PDSCH) transmitted from radio base station 10 to user terminal 20. The signal may be called RACH message 4 or may be called by another name such as Contention resolution.

In the mapping configuration of the demodulation RS for RACH message 4, the mapping method may be predefined and fixed as in mapping configuration example 1. For example, one of mapping method 1 and mapping method 2 is set in the mapping configuration of demodulation RS for RACH message 4.

Alternatively, in the mapping configuration of the demodulation RS for RACH message 4, one of mapping method 1 and mapping method 2 may be predefined, and mapping method 1 and mapping method 2 may be switchable as in mapping configuration example 2.

Alternatively, in the mapping configuration of the demodulation RS for RACH message 4, radio base station 10 may notify user terminal 20 of one of mapping method 1 and mapping method 2 as in mapping configuration example 3.

Note that the mapping configuration of the demodulation RS for RACH message 4 may be implicitly notified in association with the configuration of SS, PBCH, SIB, or RACH transmitted at a timing earlier than RACH message 4. Alternatively, user terminal 20 may blindly estimate the demodulation RS in RACH message 4. Alternatively, the mapping configuration of the demodulation RS for RACH message 4 may be explicitly notified by MIB, SIB, RACH message 2, or RACH message 3 that is control information transmitted at a timing earlier than RACH message 4.

In any case, the method of notifying the mapping configuration of the demodulation RS when user terminal 20 receives RACH message 4 for the second time or later may not be limited to the methods described above. For example, instead of SS, PBCH (MIB), SIB, or RACH messages 2 and 3, the mapping configuration of the demodulation RS for RACH message 4 of the second time or later may be implicitly or explicitly notified in association with the configuration of the channel (signal) transmitted at a timing earlier than RACH message 4 of the second time or later.

In the mapping configuration of the demodulation RS for PDSCH, the mapping method may be predefined and fixed as in mapping configuration example 1. For example, one of mapping method 1 and mapping method 2 is set in the mapping configuration of the demodulation RS for PDSCH.

Alternatively, in the mapping configuration of the demodulation RS for PDSCH, mapping method 1 or mapping method 2 may be predefined, and mapping method 1 and mapping method 2 may be switchable as in mapping configuration example 2.

Alternatively, in the mapping configuration of the demodulation RS for PDSCH, radio base station 10 may notify user terminal 20 of one of mapping method 1 and mapping method 2 as in mapping configuration example 3.

Note that the mapping configuration of the demodulation RS for PDSCH may be implicitly notified in association with the configuration of SS, PBCH, SIB, or RACH transmitted at a timing earlier than PDSCH. Alternatively, user terminal 20 may blindly estimate the demodulation RS in PDSCH. Alternatively, the mapping configuration of the demodulation RS for PDSCH may be explicitly notified by MIB, SIB, or RACH messages 2 to 4 that is control information transmitted at a timing earlier than PDSCH or may be explicitly notified by RRC or DCI because user terminal 20 is in the RRC connection state (RRC connected).

In the mapping configuration of the demodulation RS for PUSCH, the mapping method may be predefined and fixed as in mapping configuration example 1. For example, one of mapping method 1 and mapping method 2 is set in the mapping configuration of the demodulation RS for PUSCH.

Alternatively, in the mapping configuration of the demodulation RS for PUSCH, mapping method 1 or mapping method 2 may be predefined, and mapping method 1 and mapping method 2 may be switchable as in mapping configuration example 2.

Alternatively, in the mapping configuration of the demodulation RS for PUSCH, radio base station 10 may notify user terminal 20 of one of mapping method 1 and mapping method 2 as in mapping configuration example 3.

Note that the mapping configuration of the demodulation RS for PUSCH may be implicitly notified in association with the configuration of SS, PBCH, SIB, or RACH transmitted at a timing earlier than PUSCH. Alternatively, user terminal 20 may blindly estimate the demodulation RS in PUSCH. Alternatively, the mapping configuration of the demodulation RS for PUSCH may be explicitly notified by MIB, SIB, or RACH messages 2 to 4 that is control information transmitted at a timing earlier than PUSCH or may be explicitly notified by RRC or DCI because user terminal 20 is in the RRC connection state (RRC connected).

The mapping configuration and the notification method of the demodulation RS in each channel have been described.

<Advantageous Effects of Present Embodiment>

In this way, according to the present embodiment, user terminal 20 in the DL separates the demodulation RS from the DL signal and uses the demodulation RS to demodulate the data signal based on one of mapping method 1 of mapping the demodulation RS to the fixed symbol in the subframe and mapping method 2 of mapping the demodulation RS to the top symbol of the symbols to which the data signal is mapped in the subframe.

As a result of the processing, the demodulation RS appropriately mapped to the DL resource can be used to demodulate the DL data signal according to, for example, the communication status (scenario) expected in user terminal 20 in the present embodiment. Therefore, the delay or the interference during the demodulation by user terminal 20 can be prevented, and the throughput can be improved.

In UL, user terminal 20 maps the demodulation RS to the UL resource and transmits the demodulation RS based on one of mapping method 1 and mapping method 2 of the demodulation RS.

As a result of the processing, one of mapping method 1 and mapping method 2 of the demodulation RS can be used to appropriately map the demodulation RS to the UL resource according to, for example, the communication status (scenario) expected in user terminal 20 in the present embodiment. Therefore, the delay or the interference during the demodulation by radio base station 10 can be prevented, and the throughput can be improved.

Furthermore, the mapping configuration of the demodulation RS can be selected for each user terminal 20 from a plurality of mapping methods, and mapping of the demodulation RS can be supported in consideration of, for example, the expandability (Forward compatibility) of the radio communication system of the future. Therefore, according to the present embodiment, the symbol mapping of the demodulation RS can be flexibly designed according to the channel configuration in the subframe in the radio communication system of the future.

According to the present embodiment, when the mapping configuration of the demodulation RS is predefined or implicitly notified in association with an existing signal, new signaling for notifying the mapping configuration of the demodulation RS is not necessary, and an increase in the signaling overhead can be prevented.

This completes the description of the embodiment.

Note that in mapping method 1 (see FIGS. 1A and 1B) of the demodulation RS used in the description, the symbol position to which the demodulation RS is mapped may be fixed to one position or may be changeable to a plurality of symbol positions. For example, as shown in FIGS. 1A and 1B, the demodulation RS may be fixed and mapped to the fourth symbol relative to the top of the subframe in mapping method 1. The mapping to the fourth symbol may be predefined, and the mapping may be switched to the third symbol or the fifth symbol. The mapping may be switched between the third, fourth, and fifth symbols. Note that the symbols to which the demodulation RS is mapped are not limited to the third, fourth, and fifth symbols.

The symbol mapping examples of the demodulation RS shown in FIGS. 1A, 1B, 2A, and 2B used in the description are examples, and the symbol position of the demodulation RS is not limited to these. For example, it is only necessary to map the demodulation RS to any one of the symbols on the forward side of each subframe. The number of symbols to which with the demodulation RS is mapped in each subframe is not limited to one, and the demodulation RS may be mapped to a plurality of symbols. Furthermore, the demodulation RS may be dispersedly mapped to a plurality of symbols and a plurality of subcarriers.

The parameters of the mapping configuration notified by explicit signaling may be, for example, a value indicating one of mapping method 1 and mapping method 2, a mapping pattern indicating the mapping position of the demodulation RS, a transmission period of each signal, the number of signals, a sequence used, and the number of antenna ports used. The values to be indicated may be the configuration values or index values, the index values being respectively provided to the candidates of a plurality of configuration values. The values to be reported may be index values collectively provided to the candidates of a plurality of configuration values. When the index values are used, the size of signaling required for the notification of the mapping configuration can be smaller than when the configuration values are reported.

Mapping method 1 (FIGS. 1A and 1B) and mapping method 2 (FIGS. 2A and 2B) of the demodulation RS are used in the example described above. However, the mapping configuration of the demodulation RS is not limited to these mapping methods in the radio communication system according to Embodiment, and it is only necessary that a plurality of different mapping methods can be set to user terminal 20.

Radio base station 10 (scheduler 101) performs the mapping configuration (decides mapping method 1 or mapping method 2) of the demodulation RS for user terminal 20 in the example described above. However, user terminal 20 may perform the mapping configuration of the demodulation RS in the embodiment. In this case, user terminal 20 shown in FIG. 4 can be configured in the same way as scheduler 101 of radio base station 10 shown in FIG. 3.

(Hardware Configuration)

Note that the block diagrams used to describe the embodiments illustrate blocks on the basis of functions. The functional blocks (constituent sections) are realized by an arbitrary combination of hardware and/or software. Means for realizing the functional blocks is not particularly limited. More specifically, the functional blocks may be realized by one physically and/or logically coupled apparatus. Two or more physically and/or logically separated apparatuses may be directly and/or indirectly (for example, wired and/or wireless) connected, and the plurality of apparatuses may realize the functional blocks.

Figure 6:
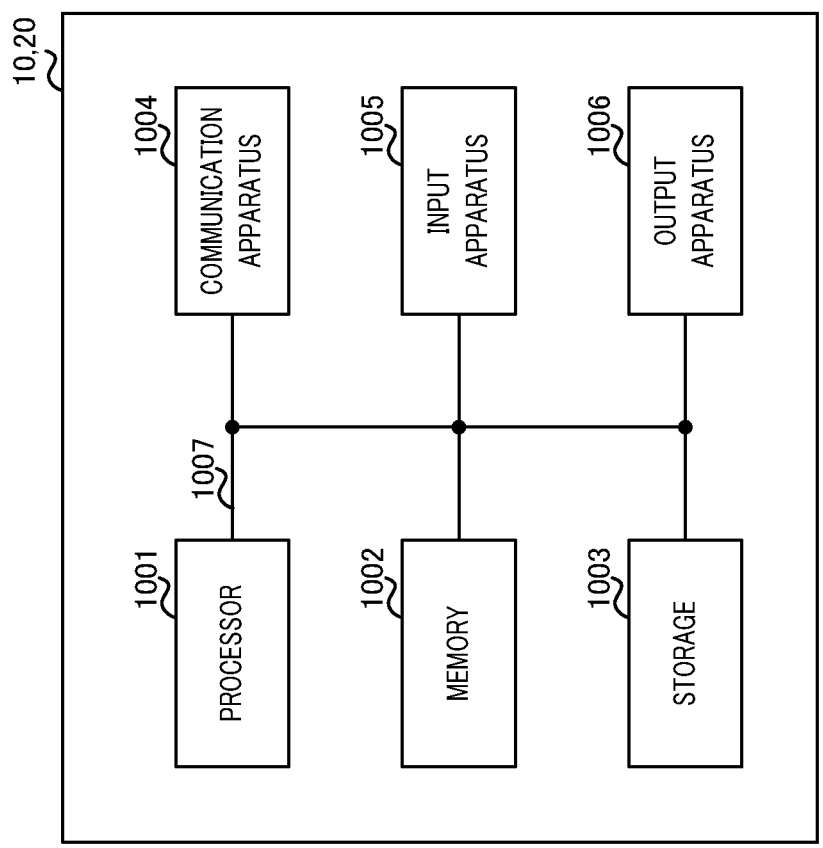
FIG. 6 illustrates an example of a hardware configuration of the radio base station and the user terminal according to the present invention.

For example, the radio base station, the user terminal, and the like according to one embodiment of the present invention may function as a computer that executes processing of a radio communication method of the present invention. FIG. 6 illustrates an example of a hardware configuration of the radio base station and the user terminal according to one Embodiment of the present invention. Radio base station 10 and user terminal 20 may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and user terminal 20 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or by other methods. Note that processor 1001 may be provided by one or more chips.

The functions of radio base station 10 and user terminal 20 are realized by loading predetermined software (program) on the hardware of processor 1001, memory 1002, or the like. Processor 1001 performs operation, and the communication by communication apparatus 1004 or reading and/or writing of data in memory 1002 and storage 1003 is controlled.

Processor 1001 operates, for example, an operating system to control the entire computer. Processor 1001 may be constituted by a central processing unit (CPU) including an interface for peripheral apparatus, a control apparatus, an operation apparatus, a register, and the like. For example, scheduler 101, transmission signal generation sections 102 and 205, coding and modulation sections 103 and 206, mapping sections 104 and 207, control sections 108 and 203, demodulation and decoding sections 109 and 204, and the like may be realized by processor 1001.

Processor 1001 executes various types of processing according to a program (program code), a software module, or data loaded from storage 1003 and/or communication apparatus 1004 to memory 1002. The program used is a program for causing the computer to execute at least part of the operation described in Embodiments. For example, scheduler 101, control sections 108 and 203 of radio base station 10 may be realized by a control program stored in memory 1002 and operated by processor 1001, and the other functional blocks may also be realized in the same way. Although the various types of processing are executed by one processor 1001 in the description, the various types of processing may be executed by two or more processors 1001 at the same time or in succession. Processor 1001 may be provided by one or more chips. Note that the program may be transmitted from a network through a telecommunication line.

Memory 1002 is a computer-readable recording medium and may be constituted by, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to one embodiment of the present invention.

Storage 1003 is a computer-readable recording medium and may be constituted by, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may be called an auxiliary storage apparatus.

The storage medium may be, for example, a database, a server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmission sections 105 and 208, antennas 106 and 201, reception sections 107 and 202, and the like may be realized by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) for output to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be set by a single bus or may be set by different buses between the apparatuses.

Furthermore, radio base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may realize part or all of the functional blocks. For example, processor 1001 may be provided by at least one of these pieces of hardware.

(Notification and Signaling of Information)

The notification of information is not limited to the modes and embodiments described in the present specification, and the information may be notified by another method. For example, the of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and Embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system expanded based on these.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations performed by the base station (radio base station) in the specification may be performed by an upper node depending on the situation. Various operations performed for communication with a terminal in a network constituted by one or a plurality of network nodes including a base station can be obviously performed by the base station and/or a network node other than the base station (examples include, but not limited to, MME (Mobility Management Entity) and S-GW (Serving Gateway)). Although there is one network node other than the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Judgement Method)

The judgement may be made based on a value expressed by 1 bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by other names, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, may be expressed by values relative to predetermined values, or expressed by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one or a plurality of (for example, three) cells (also called sectors). When the base station accommodates a plurality of cells, the entire coverage area of the base station can be divided into a plurality of smaller areas, and each smaller area can provide a communication service based on a base station subsystem (for example, small base station for indoor, RRH: Remote Radio Head). The term "cell" or "sector" denotes the base station that performs the communication service in the coverage and/or part or all of the coverage area of the base station subsystem. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

The terms "determining" and "deciding" used in the present specification may include a variety of operations. "Determining" and "deciding" can include, for example, cases in which judging, calculating, computing, processing, deriving, investigating, looking up (for example, looking up in a table, a database, or another data structure), and ascertaining are assumed as "determining" and "deciding". "Determining" and "deciding" can also include cases in which receiving (for example, receiving information), transmitting (for example, transmitting information), inputting, outputting, and accessing (for example, accessing data in the memory) are assumed as "determining" and "deciding". "Determining" and "deciding" can also include cases in which resolving, selecting, choosing, establishing, comparing, and the like are assumed as "determining" and "deciding". Therefore, "determining" and "deciding" can include cases in which operations are assumed as "determining" and "deciding".

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limited and non-inclusive examples.

The reference signal can also be abbreviated as RS and may also be called a pilot depending on the applied standard. The demodulation RS may be called by other corresponding names.

The description "based on" used in the present specification does not mean "only based on," unless otherwise specifically stated. In other words, the description "based on" means both of "only based on" and "at least based on."

The "section" in the configuration of each apparatus may be replaced with "means," "circuit," "device," or the like.

The terms "including," "comprising," and modifications of these are intended to be inclusive just like the term "having," as long as the terms are used in the present specification or the appended claims. Furthermore, the term "or" used in the present specification or the appended claims is not intended to be an exclusive or.

The radio frame may be constituted by one or a plurality of frames in the time domain. One or each of a plurality of frames may be called a subframe, a time unit, or the like in the time domain. The subframe may be further constituted by one or a plurality of slots in the time domain. The slot may be further constituted by one or a plurality of symbols (OFDM (Orthogonal Frequency Division Multiplexing) symbols, SC-FDMA (Single Carrier-Frequency Division Multiple Access) symbols, or the like) in the time domain.

The radio frame, the subframe, the slot, the mini slot, and the symbol indicate time units in transmitting signals. The radio frame, the subframe, the slot, the mini slot, and the symbol may be called by other corresponding names.

For example, in the LTE system, the base station creates a schedule for allocating radio resources to each mobile station (such as frequency bandwidth that can be used by each mobile station and transmission power). The minimum time unit of scheduling may be called a TTI (Transmission Time Interval).

For example, one subframe may be called a TTI. A plurality of continuous subframes may be called a TTI. One slot may be called a TTI. One mini slot may be called a TTI.

The resource unit is a resource allocation unit of the time domain and the frequency domain, and the resource unit may include one or a plurality of continuous subcarriers in the frequency domain. One or a plurality of symbols may be included in the time domain of the resource unit, and the length may be one slot, one mini slot, one subframe, or one TTI. One TTI and one subframe may be constituted by one or a plurality of resource units. The resource unit may be called a resource block (RB), a physical resource block (PRB: Physical RB), a PRB pair, an RB pair, a scheduling unit, a frequency unit, or a subband. The resource unit may be constituted by one or a plurality of REs. For example, it is only necessary that one RE be a resource in a unit (for example, minimum resource unit) smaller than the resource unit serving as a resource allocation unit, and the naming is not limited to RE.

The structure of the radio frame is illustrative only, and the number of subframes included in the radio frame, the number of slots included in the subframe, the number of mini slots included in the subframe, the numbers of symbols and resource blocks included in the slot, and the number of subcarriers included in the resource block can be changed in various ways.

When articles, such as "a", "an", and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and the notification of the predetermined information may be implicit (for example, by not notifying the predetermined information).

Although the present invention has been described in detail, it is obvious for those skilled in the art that the present invention is not limited to Embodiments described in the present specification. Modified and changed modes of the present invention can be carried out without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-019118 filed on Feb. 3, 2017, and the entire content of Japanese Patent Application No. 2017-019118 is hereby incorporated by reference.

INDUSTRIAL APPLICABILITY

An aspect of the present invention is useful for a mobile communication system.

REFERENCE SIGNS LIST

10 Radio base station
20 User terminal
101 Scheduler
102, 205 Transmission signal generation section
103, 206 Coding and modulation section
104, 207 Mapping section
105, 208 Transmission section
106, 201 Antenna
107, 202 Reception section
108, 203 Control section
109, 204 Demodulation and decoding section

The invention claimed is:

1. A terminal, comprising:
a receiver that receives a signal of a downlink shared channel and information providing one of index values, the index values being respectively provided to candidates of configuration values of parameters including a mapping method of a demodulation reference signal, and including a number of symbols corresponding to mapping of the demodulation reference signal; and
a processor that controls reception of the demodulation reference signal included in the downlink shared channel using one of a first mapping method and a second mapping method based on the information providing the one of the index values, the first mapping method being a method in which the demodulation reference signal is mapped to a fixed symbol within a slot of the downlink shared channel, the second mapping method being a method in which the demodulation reference signal is mapped to a top symbol of symbols for which the downlink shared channel is scheduled.

2. The terminal according to claim 1, wherein the receiver receives the information providing the one of the index values via downlink control information.

3. The terminal according to claim 1, wherein the receiver receives the information providing the one of the index values and receives the signal of the downlink shared channel based on the information providing the one of the index values.

4. A terminal, comprising:
a receiver that receives information providing one of index values, the index values being respectively provided to candidates of configuration values of parameters including a mapping method of a demodulation reference signal, and including a number of symbols corresponding to a mapping of the demodulation reference signal;
a processor that maps the demodulation reference signal using one of a first mapping method and a second mapping method based on the information providing the one of the index values, the first mapping method being a method in which the demodulation reference signal is mapped to a fixed symbol within a slot of an uplink shared channel, the second mapping method being a method in which the demodulation reference signal is mapped to a top symbol of symbols for which the uplink shared channel is scheduled; and
a transmitter that transmits the demodulation reference signal.

5. The terminal according to claim 4, wherein the terminal receives the information providing the one of the index values via downlink control information.

6. The terminal according to claim 4, wherein the receiver receives the information providing the one of the index values and receives the signal of the downlink shared channel based on the information providing the one of the index values.

7. A base station, comprising:
a processor that maps a demodulation reference signal using one of a first mapping method or a second mapping method, the first mapping method being a method in which the demodulation reference signal is mapped to a fixed symbol within a slot of a downlink shared channel, the second mapping method being a method in which the demodulation reference signal is mapped to a top symbol of symbols for which the downlink shared channel is scheduled; and
a transmitter that transmits the demodulation reference signal and information providing one of index values, the index values being respectively provided to candidates of configuration values of parameters including a mapping method of the demodulation reference signal, and including a number of symbols corresponding to a mapping of the demodulation reference signal.

8. The base station according to claim 7, wherein the transmitter transmits the information providing the one of the index values via downlink control information.

9. The base station according to claim 7, wherein the transmitter transmits the information providing the one of the index values and transmits a signal of the downlink shared channel based on the information providing the one of the index values.

10. A system comprising:
a base station comprising a processor that maps a demodulation reference signal using one of a first mapping method and a second mapping method, and a transmitter that transmits the demodulation reference signal and information providing one of index values, the index values being respectively provided to candidates of configuration values of parameters including a mapping method of the demodulation reference signal, and including a number of symbols corresponding to a mapping of the demodulation reference signal, the first mapping method being a method in which the demodulation reference signal is mapped to a fixed symbol within a slot of a downlink shared channel, the second mapping method being a method in which the demodulation reference signal is mapped to a top symbol of symbols for which the downlink shared channel is scheduled; and a terminal comprising a receiver that receives a signal of the downlink shared channel and the information providing the one of the index values, and a processor that controls reception of the demodulation reference signal included in the downlink shared channel using one of the first mapping method and the second mapping method based on the information providing the one of the index values.

11. The system according to claim 10, wherein:

the base station transmits the information providing the one of the index values and transmits the signal of the downlink shared channel based on the information providing the one of the index values; and the terminal receives the information and receives the signal of the downlink shared channel based on the information providing the one of the index values.

* * * * *